(12) United States Patent
Hosomi

(10) Patent No.: US 7,359,424 B2
(45) Date of Patent: Apr. 15, 2008

(54) SPREAD SPECTRUM COMMUNICATION SYSTEM AND METHOD THEREFOR

(75) Inventor: Takahiro Hosomi, Tokyo (JP)

(73) Assignee: NEC Corporation, Tokyo (JP)

( * ) Notice: Subject to any disclaimer, the term of this patent is extended or adjusted under 35 U.S.C. 154(b) by 1087 days.

(21) Appl. No.: 09/891,235

(22) Filed: Jun. 27, 2001

(65) Prior Publication Data
US 2002/0001336 A1    Jan. 3, 2002

(30) Foreign Application Priority Data
Jun. 28, 2000    (JP) ............................. 2000-193644

(51) Int. Cl.
H04B 1/00    (2006.01)
(52) U.S. Cl. ...................... 375/130; 375/140; 375/285; 375/296; 375/297
(58) Field of Classification Search ................ 375/130, 375/140, 135, 141, 144, 146, 145, 285, 296; 370/335, 342
See application file for complete search history.

(56) References Cited

U.S. PATENT DOCUMENTS

| | | | |
|---|---|---|---|
| 5,321,721 A | 6/1994 | Yamaura et al. | |
| 5,504,776 A | 4/1996 | Yamaura et al. | |
| 5,546,424 A | 8/1996 | Miyaka | |
| 5,697,053 A * | 12/1997 | Hanly | 455/33.1 |
| 5,754,583 A | 5/1998 | Eberhardt et al. | |
| 5,758,271 A | 5/1998 | Rich | |
| 5,930,288 A | 7/1999 | Eberhardt | |
| 6,070,062 A | 5/2000 | Yoshida et al. | |
| 6,144,841 A * | 11/2000 | Feeney | 455/69 |
| 6,252,898 B1 * | 6/2001 | Eto et al. | 375/150 |
| 6,330,462 B1 * | 12/2001 | Chen | 455/572 |
| 6,334,047 B1 * | 12/2001 | Andersson et al. | 455/69 |
| 6,377,782 B1 * | 4/2002 | Bishop et al. | 455/3.01 |
| 6,415,153 B1 * | 7/2002 | Liew | 455/453 |
| 6,510,147 B1 * | 1/2003 | Sun et al. | 370/335 |
| 6,594,279 B1 * | 7/2003 | Nguyen et al. | 370/468 |
| 6,606,357 B1 * | 8/2003 | Cobb et al. | 375/281 |
| 6,615,382 B1 * | 9/2003 | Kang et al. | 714/748 |
| 6,654,616 B1 * | 11/2003 | Pope et al. | 455/556 |
| 6,738,367 B1 * | 5/2004 | Seo | 370/342 |
| 6,870,816 B1 * | 3/2005 | Edwards et al. | 370/252 |
| 6,947,407 B2 * | 9/2005 | Ayyagari et al. | 370/342 |

(Continued)

FOREIGN PATENT DOCUMENTS

CN    1140938    1/1997

(Continued)

OTHER PUBLICATIONS

L. Vandendorpe, "Multitone Spread Spectrum Multiple Access in a Multipath Rician Fading Channel", IEEE Transactions on Vehicular Technology, vol. 44, No. 2, May 1995, pp. 327-337.*

*Primary Examiner*—Mohammed Ghayour
*Assistant Examiner*—Juan Alberto Torres
(74) *Attorney, Agent, or Firm*—Foley & Lardner LLP

(57) ABSTRACT

A spread spectrum communication system and a method can provide resistance against selective fading and can prevent lowering of circuit use ratio with lowering reception bit error ratio. The spread spectrum communication system has a control unit for controlling a transmission band width and a transmission power of a counterpart equipment depending upon a communication quality.

20 Claims, 7 Drawing Sheets

U.S. PATENT DOCUMENTS

| | | | |
|---|---|---|---|
| 2001/0011954 A1* | 8/2001 | Shelton et al. | 340/825.49 |
| 2001/0055966 A1* | 12/2001 | Hanly | 455/422 |
| 2003/0086478 A1* | 5/2003 | Lee et al. | 375/130 |

FOREIGN PATENT DOCUMENTS

| | | |
|---|---|---|
| CN | 1185702 | 6/1998 |
| CN | 1197339 | 10/1998 |
| EP | 0 930 721 A1 | 7/1999 |
| JP | 6-14006 | 1/1994 |
| JP | 6-014006 | 1/1994 |
| JP | 6-46033 | 2/1994 |
| JP | 6-046033 | 2/1994 |
| JP | 6-140976 | 5/1994 |
| JP | 6-216875 | 8/1994 |
| JP | 6-252881 | 9/1994 |
| JP | 6-276176 | 9/1994 |
| JP | 7-74725 | 3/1995 |
| JP | 8-70479 | 3/1996 |
| JP | 9-247079 | 9/1997 |

* cited by examiner

FILTERING CHARACTERISTICS OF FADING

NARROW BAND SIGNAL UNDER FADING ENVIRONMENT

WIDE BAND SIGNAL UNDER
FADING ENVIRONMENT

SPREAD SPECTRUM COMMUNICATION SYSTEM AND METHOD THEREFOR

BACKGROUND OF THE INVENTION

1. Field of the Invention

The present invention relates generally to a spread spectrum communication system and a method therefor. More particularly, the invention relates to a spread spectrum communication system and a method therefor of direct spread system.

2. Description of the Related Art

Conventionally, in a direct spread system, it has been taken a method for increasing and decreasing a transmission power depending upon increasing and decreasing of a reception bit error ratio for stabilizing communication quality. Namely, when the reception bit error ratio is increased, the transmission power is increased and when the reception bit error ratio is decreased, the transmission power is decreased.

In the conventional spread spectrum communication system, a band width of a channel is determined per system. When a data transmission rate is varied, the channel to be used is varied to other channel having a band width of double, four times and eight times wider band width. However, it should be questionable whether a channel band width of the conventional system is reasonable in view of communication quality and circuit capacity in practical use and currently in process of trial and error. Namely, even the band width unnecessary in a certain communication environment for a certain circuit at one timing, a broader band width may be required at other timing. Therefore, it is an effort for deriving an optimum value of the band width. On the other hand, due to abrupt depletion of a frequency resource in the recent years, a communication system of greater capacity has been desired. Furthermore, it has been demanded longer waiting period by further power saving, expansion of communication period, reduction of battery capacity and reduction of weight of the terminal.

Therefore, technologies for varying frequency band width depending upon conditions have been disclosed in Japanese Unexamined Patent Publication No. Heisei 6-14006 (hereinafter referred to as publication 1), Japanese Unexamined Patent Publication No. Heisei 6-46033 (hereinafter referred to as publication 2), Japanese Unexamined Patent Publication No. Heisei 6-216875 (hereinafter referred to as publication 3) and Japanese Unexamined Patent Publication No. Heisei 6-252881 (hereinafter referred to as publication 4).

The technology disclosed in the publication 1 is to widen the frequency band width when transmission quality is lowered. The technology disclosed in the publication 2 lowers error correction capacity when the bit error ratio is small to narrow frequency bandwidth by lowering information transmission speed. The technology disclosed in the publication 3 narrows the frequency band width by lowering process gain when the bit error ratio is small. The technology disclosed in the publication 4 is to make judgment of transmission path condition from the result of bit error ratio to narrow the bands using QPSK modulation when the transmission path condition is good, and to widen the band with BPSK modulation when the transmission path condition is no good.

The technologies of the publications 1 and 4 are common in widening the frequency band width when the transmission quality is lowered. On the other hand, in the technologies disclosed in the publications 2 and 3, there is no disclosure when the transmission quality is lowered.

However, the method for increasing and decreasing transmission power depending upon increasing and decreasing reception bit error ratio, will not provide any essential solution for selective fading, in which a certain band in the carrier wave band drops out. On the other hand, since increasing of transmission power is taken as measure for lowering of reception bit error ratio by the selective fading, it has been feared influence for multiplexed other channels.

On the other hand, in the technology to widen the frequency bandwidth when the transmission quality is lowered as disclosed in the publications 1 and 4, a defect is encountered in that widening of the frequency band width inherently cause lowering of the circuit use ratio per unit frequency.

SUMMARY OF THE INVENTION

Therefore, it is an object of the present invention to provide a spread spectrum communication system and a method therefore which can provide resistance against selective fading and can prevent lowering of circuit use ratio with lowering reception bit error ratio.

According to the first aspect of the present invention, a spread spectrum communication system comprises control means for controlling a transmission band width and a transmission power of a counterpart equipment depending upon a communication quality.

According to the second aspect of the present invention, a spread spectrum communication method comprises control step of controlling a transmission band width and a transmission power of a counterpart equipment depending upon a communication quality.

According to the present invention, when the communication quality is degraded, the transmission band width is widen when the remaining circuit has a margin. If margin is not available, the transmission power is increased. Therefore, resistance against selective fading can be provided and reception bit error ratio can be lowered to prevent lowering of circuit use ratio.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

At first, feature of the present invention will be discussed. The present invention features in providing stable communication quality by a direct spread type spread spectrum communication system. The present invention provides more stable communication quality by optimally controlling not only a transmission power depending upon increasing and decreasing of a reception bit error ratio and but also increasing and decreasing of a transmission band width. Namely, when communication quality is degraded, selective fading is avoided by widening the frequency and width if there is a margin in remaining circuits, and to rise a transmission power if there is no margin in remaining circuits.

By this, the transmission power can be suppressed to be low to lower power consumption, can restrict influence for code multiplexed other channels and so forth. On the other hand, by restricting influence for the multiplexed other channels, increasing of the circuit capacity is expected.

Figure 1:
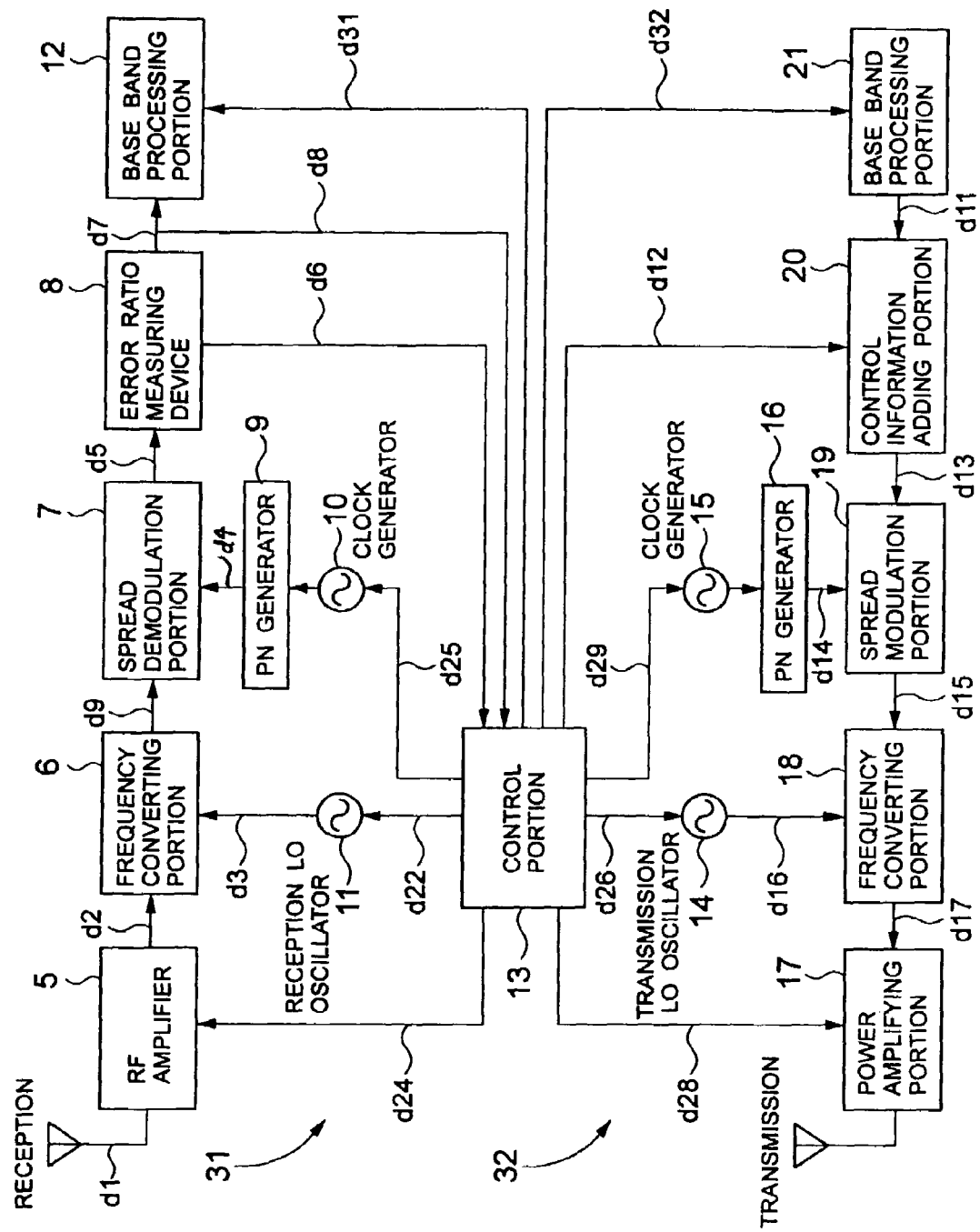
FIG. 1 is an illustration showing a construction of the preferred embodiment of a spread spectrum communication system according to the present invention.
Figure 5:
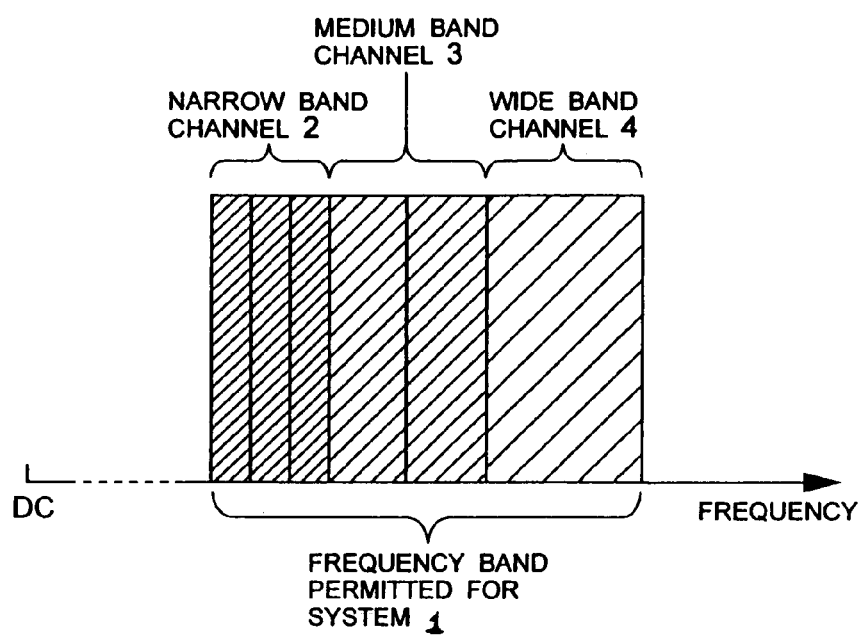
FIG. 5 is a conceptual illustration of a frequency band used in the present invention.

Next, discussion will be given for the frequency band top be used in the present invention. FIG. 5 is a conceptual illustration of a frequency band to be used in the present invention. As shown in FIG. 5, in the present invention, an allowable range of frequency is divided into channels having several kinds of band widths. As one example of the shown embodiment, a frequency band 1 which a certain system can use, is divided into a narrow band channel 2, an intermediate band channel 3 and a wide band channel 4, and respectively provided 3, 2, 1 channels to have six channels in total. On the other hand, both up (transmission) and down (reception) are divided from narrow band channel to wide band channel. Each spread spectrum communication system selects the channel to be used by own system among several kinds of band width channels. On the other hand, the spread spectrum communication system which has a spread spectrum communication equipment having a chip rate varying mechanism as shown in FIG. 1 enables selection of optimal several kinds of band widths by a control portion 13 having a construction shown in FIG. 2 and performing operation according to the flow chart shown in FIG. 3, a clock oscillators 10 and 15, local (LO) oscillators 11 and 14 and an error ratio measuring device 8 to minimize the transmission power.

Hereinafter, the embodiment of the present invention will be discussed with reference to the accompanying drawings. FIG. 1 is an illustration showing a construction of the preferred embodiment of the spread spectrum communication system according to the present invention. Referring to FIG. 1, the spread spectrum communication system is constructed with a receiving portion 31, a transmitting portion 32 and the control portion 13.

Then, the receiving portion 31 is constructed with an RF amplification portion 5, a frequency converting portion 6, a spread demodulating portion 7, the error ratio measuring device 8, a PN (pseudo noise) generator 9, the clock generator 10, reception LO (local) oscillator 11 and a base band processing portion 12.

On the other hand, the transmitting portion 32 is constructed with a power amplifying portion 17, a frequency converting portion 18, a spread modulating portion 19, a control information adding portion 20, a PN (pseudo noise) generator 16, the clock generator 15, the transmission LO (local) oscillator 14 and a base band processing portion 21.

Figure 4:
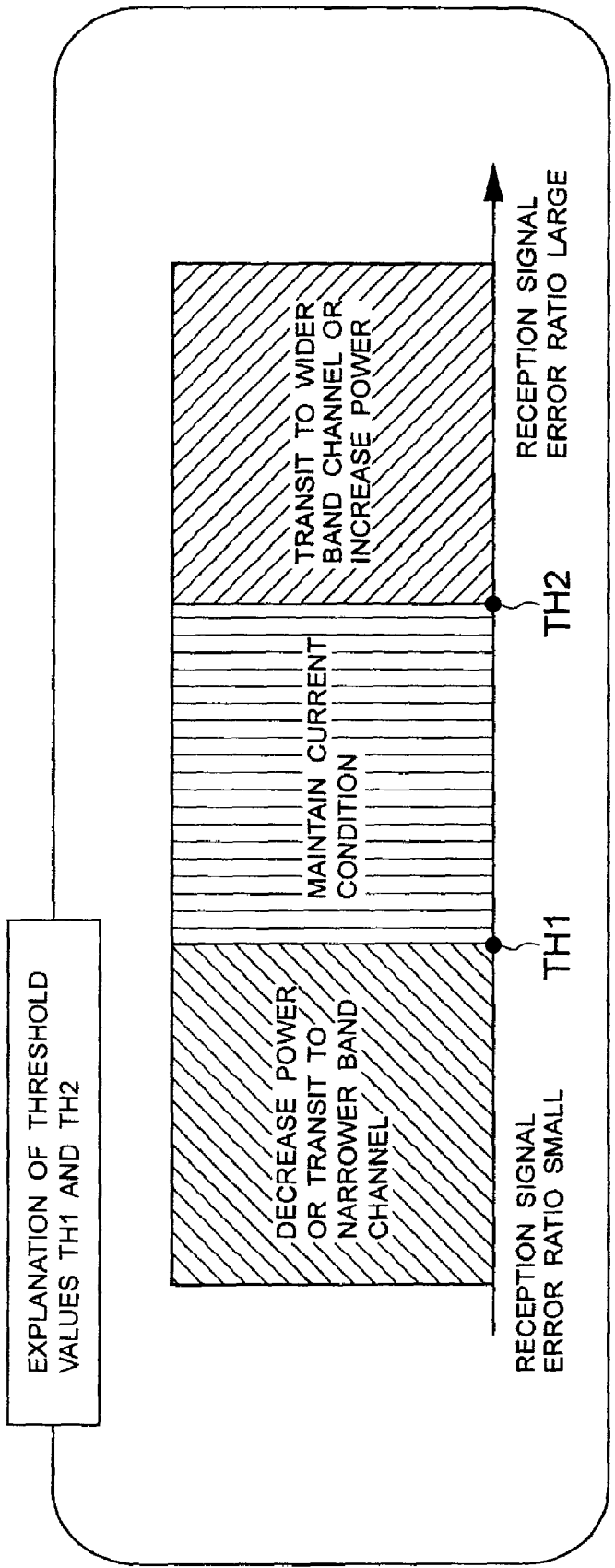
FIG. 4 is an explanatory illustration of the threshold value.

The control portion 13 controls which band is to be selected among the frequency bands shown in FIG. 4. The control portion 13 controls frequency of the clock generator 10. The PN generator 9 generates a PN code at a chip rate determined by the clock generator 10. By the chip rate, the frequency band to be selected, namely one of the narrow band channel 2, the intermediate band channel 3 and the wide band channel 4 is selected.

Similarly, the control portion 13 controls the frequency of the clock oscillator 15. The PN generator 16 generates the PN code at the chip rate determined by the clock oscillator 15. By the chip rate, the frequency band to be selected, namely one of the narrow band channel 2, the intermediate band channel 3 and the wide band channel 4 is selected.

Furthermore, the control portion 13 controls the frequency of the reception LO oscillator 11. By this, the frequency of the channel to be selected is set. Namely, if the channel to be selected is the narrow band channel 2, one channel out of three channels is selected. When the channel to be selected is the intermediate band channel 3, one channel out of two channels is selected. When the channel to be selected is the wide band channel 4, the sole wide band channel is selected.

Similarly, the control portion 13 controls the frequency of the transmission LO oscillator 14. By this, the frequency of the channel to be selected is set. Namely, if the channel to be selected is the narrow band channel 2, one channel out of three channels is selected. When the channel to be selected is the intermediate band channel 3, one channel out of two channels is selected. When the channel to be selected is the wide band channel 4, the sole wide band channel is selected.

On the other hand, the control portion 13 has a use information of the frequency resource and performs action for assigning marginal band. Accordingly, for the spread spectrum communication system, it is not necessary to have the same band width in transmitting wave and receiving wave and both can be set dynamically, and also can set either one fixedly.

Furthermore, the control portion 13 has a function for controlling reception gain by controlling the RF amplifying portion 5 and controlling the transmission power by controlling the power amplifying portion 17.

It should be noted that discussion will be given later for the information based on which these controls are performed.

Discussion will be given for operation of the spread spectrum communication system. The received RF signal d1 is amplified by the RF amplifying portion 5 to be a signal d2 and then input to the frequency converting portion 6. The signal d2 to be input to the frequency converting portion 6 is converted into a signal d9 by mixing with a received LO signal d3 generated from the received LO oscillator 11. Then, the signal d9 is demodulated with the PN code d4 generated from the PN generator 9 by the spread demodulating portion 7 to be a demodulated signal (base band signal) d5. The base band signal d5 is input to the error ratio measuring device 8 to measure the error ratio. The obtained error ratio information d6 and a transmission command information d8 extracted from the demodulated digital signal d7 are reported to the control portion 13. On the other hand, the digital signal d7 is input to the base band processing portion 12 to subject to base band process.

On the other hand, the transmission information d11 base band processed by the base band processing portion 21 is input to control information adding portion 20. In the control information adding portion 20, the transmission command information d12 to the counterpart station from the control portion 13 is added to the transmission information d11. The output signal d13 from the control information adding portion 20 is input to the spread modulating portion 19 to subject to spread modulation with the PN code d14 generated from the PN generator 16 to be a modulated signal d15. The modulated signal d15 is mixed with the transmission LO signal d16 of the transmission LO oscillator 14 by the frequency converting portion 18 and thus converted into a signal d17. The signal d17 is amplified into a predetermined power by the power amplifying portion 17 and thereafter transmitted.

Figure 2:
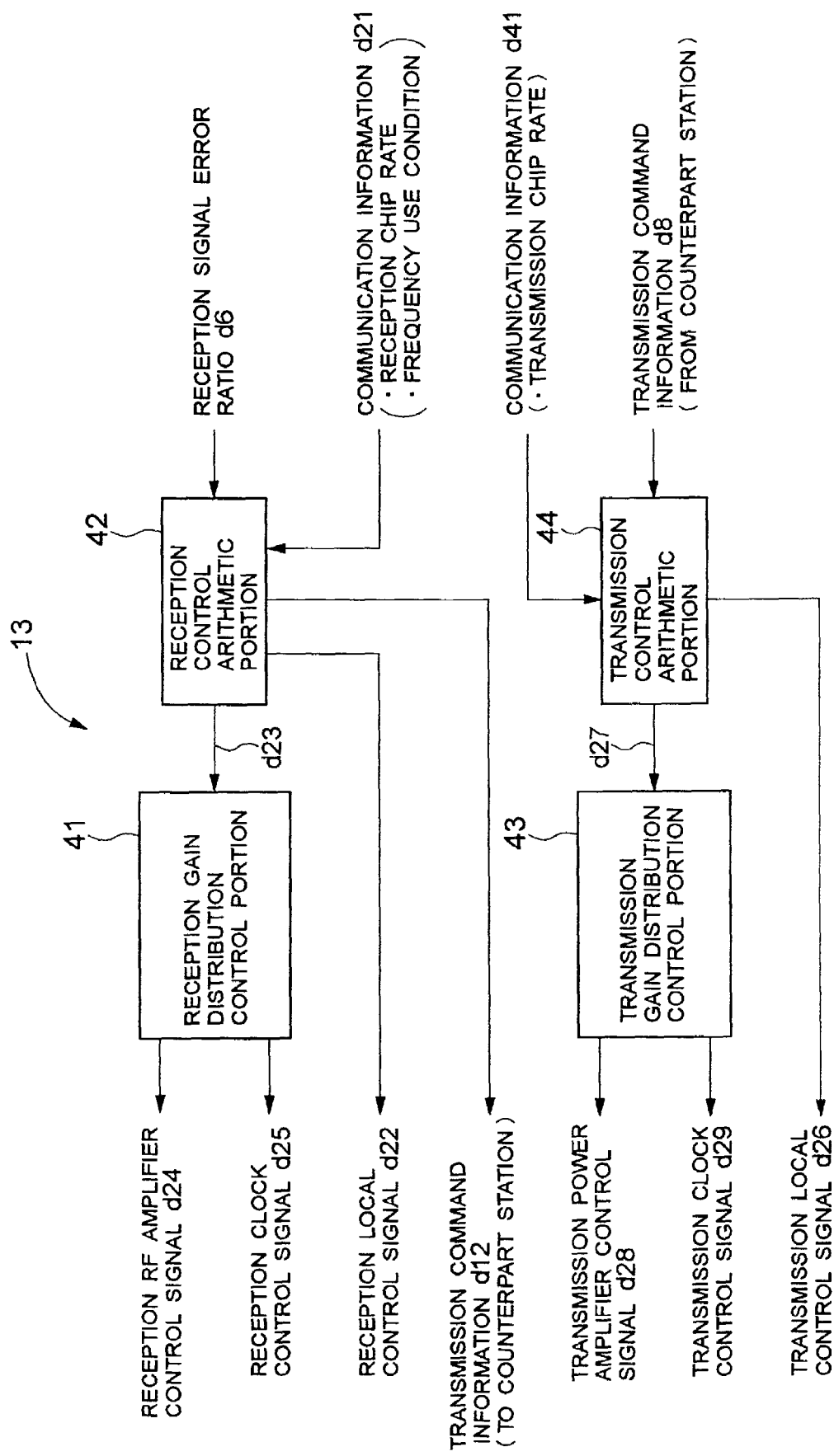
FIG. 2 is an illustration showing a construction of one example of a control portion 13.

Next, the construction of the control portion 13 will be discussed. FIG. 2 is an illustration showing a construction of one example of the control portion 13. Referring to FIG. 2, the control portion 13 is constructed with a reception gain distribution control portion 41, a reception control arithmetic portion 42, a transmitter gain distribution control portion 43 and a transmission control arithmetic portion 44.

Next, discussion will be given for operation of the control portion 13. Referring to FIG. 2, the control portion 13 derives the transmission command information d12, the reception local control signal d22 and a receiver gain d23 to the counterpart station by the reception control arithmetic portion 42 on the basis of the signal error ratio information d6 measured by the error ratio measuring device 8 and the communication information d21 including the current reception chip rate and the frequency use condition. The reception gain distribution control portion 41 receiving the receiver gain d23 transmits the reception RF amplifier control signal d24 and the reception clock control signal d25. The transmission control arithmetic portion 44 receives the communication information d41 including the transmission chip rate and the transmission command information d8 from the counterpart station and derives the transmission local control signal d26 and the transmitter gain d27. The transmitter gain distribution control portion 43 receiving the transmitter gain d27 outputs the transmission power amplifier control signal d28 and the transmission clock control signal d29.

Next, particular operation will be discussed. In the following discussion, the own station is referred to as communication station A and the counterpart station is referred to as communication station B.

① The control portion 13 of the communication station A determines increasing and decreasing of band width, frequency and power of the communication station B to transmit data to be transmitted to the communication station B with adding transmission command information d12.

② At the same time, the control portion 13 of the communication station A switches the reception band width and the frequency of the communication station A at an appropriate timing so as to receive the transmission weave of the communication station B according to the transmission command information d12.

③ When the communication station B receives data transmitted from the communication station A, the control portion 13 controls the band width and power to be transmitted according to data d8 extracted from the received data.

④ Furthermore, the control portion 13 of the communication station B determined increasing and decreasing of the band width, frequency and the power of the communication station A according to the error ratio information d6 from the error ratio measuring device 8 to transmit the data to be transmitted with adding transmission command information d12 to the communication station A.

⑤ At the same time, the control portion 13 of the communication station B switches the reception band width and the frequency of the communication station B at an appropriate timing so as to receive the transmission weave of the communication station A according to the transmission command information d12.

⑥ When the communication station A receives data transmitted from the communication station B, the control portion 13 controls the band width and power to be transmitted according to data d8 extracted from the received data.

Figure 3:
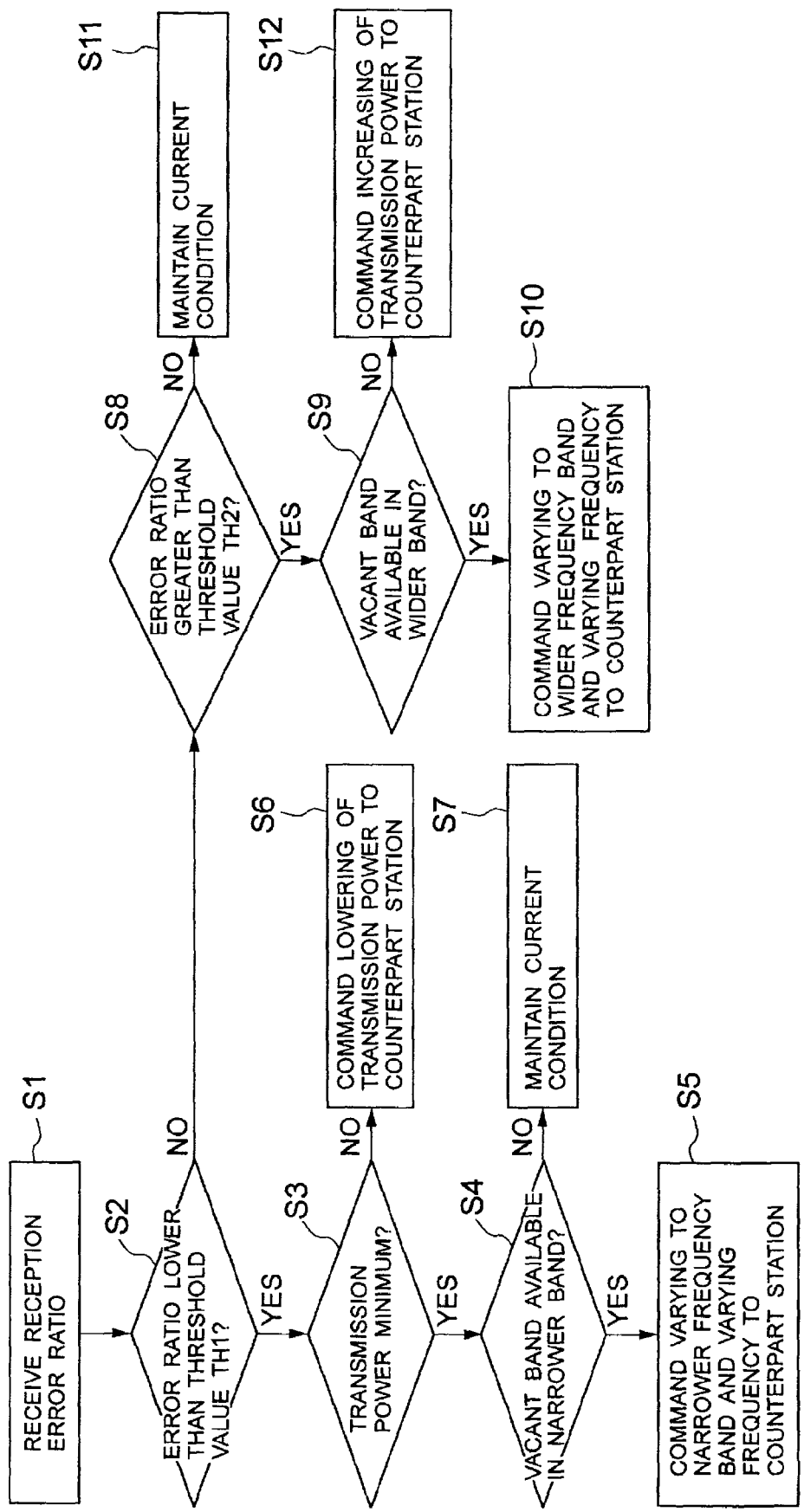
FIG. 3 is a flowchart showing one example of an operation of deriving a transmission command for a counterpart station.

Hereinafter, the operation from ① to ⑥ is repeated. Thus, the communication stations A and B forms a loop to autonomously control transmission and reception.

next, discussion will be given for operation for deriving the transmission command in the control portion 13 with reference to FIGS. 3 and 4. FIG. 3 is a flowchart showing one example of operation for deriving the transmission command for the counterpart station, and FIG. 4 is an explanatory illustration of a threshold value.

As shown in FIG. 4, for the reception error ratio d6, threshold values TH1 and TH2 (it is assumed that TH1<TH2) are set preliminarily. Referring to FIG. 3, when the control portion 13 receives the reception error ratio d6 (S1), check is performed whether the reception error ratio d6 is less than the threshold value TH1 (S2). Then, when judgment is made that the reception error ratio d6 is less than the threshold value TH1 (YES at step S2), check is performed whether the transmission power of the counterpart station is minimum or not (S3). When judgment is made that the transmission power is minimum (YES at step S3), check is performed whether vacant band is present in narrower band than the currently used frequency band or not (S4). Then, if judgment is made that vacant band is present in the narrower band (YES at step S4), varying to the narrower band and varying the frequency are commanded to the counterpart station (S5).

On the other hand, when judgment is made that the transmission power of the counterpart station is not minimum (NO at step S3), lowering of the transmission power is commanded to the counterpart station (S6). On the other hand, when judgment is made that vacant band is not present in the narrower band (NO at step S4), maintaining of the current transmission power and the frequency band is commanded to the counterpart station (S7).

Furthermore, when the reception error ratio d6 as checked at step S2 is not less than the threshold value TH1 (greater than or equal to the threshold value TH1) (NO at step S2), further check is performed whether the reception error ratio d6 is greater than or equal to the threshold value TH2 or not (S8). If judgment is made that the reception error ratio d6 is greater than or equal to the threshold value TH2 (YES at step S8), check is performed whether vacant band is present in wider band than the currently used frequency band (S9). If judgment is made that vacant band is present in the wider band (YES at step S9), varying of the band from narrower band to wider band and varying of frequency is commanded to the counterpart station (S10).

On the other hand, when the reception error ratio d6 as checked at step S8 is not greater than or equal to the threshold value TH2 (less than the threshold value TH2) (NO at step S8), maintaining of the current transmission power and the frequency band is commanded to the counterpart station (S11). On the other hand, if no vacant band in the wider band is judged at step S9 (NO at step S9), rising of the transmission power is commanded to the counterpart station (S12).

It should be noted that while the shown embodiment statically sets the band width of the channel (see FIG. 5), it is also possible to dynamically set arrangement of respective channels on a frequency axis and respective bandwidths. Also, while channel selection is performed autonomous discrete manner per each station, it is also possible to perform concentrically perform channel assignment for respective circuits on the side of the base station on the basis of information from respective terminals, for example.

Hereinafter, discussion will be given for the embodiment of the present invention. At first, the first embodiment will be discussed. In the foregoing embodiment, variation of the band width is effective by varying the chip rate, it is also possible to vary the band width by varying a data rate. The following first embodiment is directed to varying of the data rate.

At first, as a premise, the following conditions are satisfied.
(1) data rate x spreading ratio=chip rate is established:
(2) a spread gain is proportional to a spread ratio; and
(3) transmission quality is improved under the condition that SN ratio is large, spread gain is large and restriction by fading is small and so forth.

Namely, the shown system is a system which varies the frequency band by varying the data ratio without varying the spread ratio upon varying the chip rate. The algorithm thereof is similar to the system varying the spread ratio by varying the chip rate. Therefore, the base band processing portions 12 and 21 are provided a function for selecting to vary the data rate or to vary the spread ratio (see control signals d31 and d32 from the control portion 13 to the base band processing portions 12 and 21 of FIG. 1). Namely, the base band processing portion 12 and 21 performs selection to vary the data rate or to vary the spread ratio on the basis of the control signals d31 and d32.

Next, discussion will be given for the second embodiment. While the band width is varied by varying the data rate in the first embodiment, it is also possible to vary the band width by varying the bit number of the error correction code. The second embodiment is directed to varying of the bit number of the error correction code.

Figure 6:
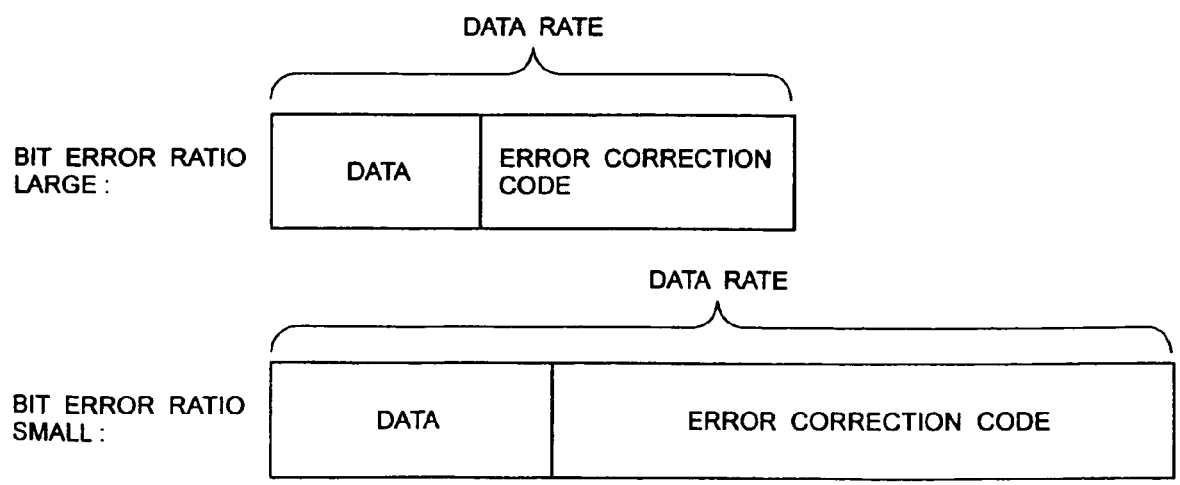
FIG. 6 is an illustration showing a relationship between an error correction code and a data rate.

FIG. 6 is an illustration showing a relationship between the error correction code and the data rate. As shown in FIG. 6, by increasing and decreasing bit number of the error correction code (ratio of error correction code) without varying the data amount per unit period, the data rate can be increased and decreased and whereby can vary the band width. By this, it can be expected to achieve not only optimization of the frequency band width for fading environment but also lowering of the bit error rate by increasing of the error correction code.

Figure 7:
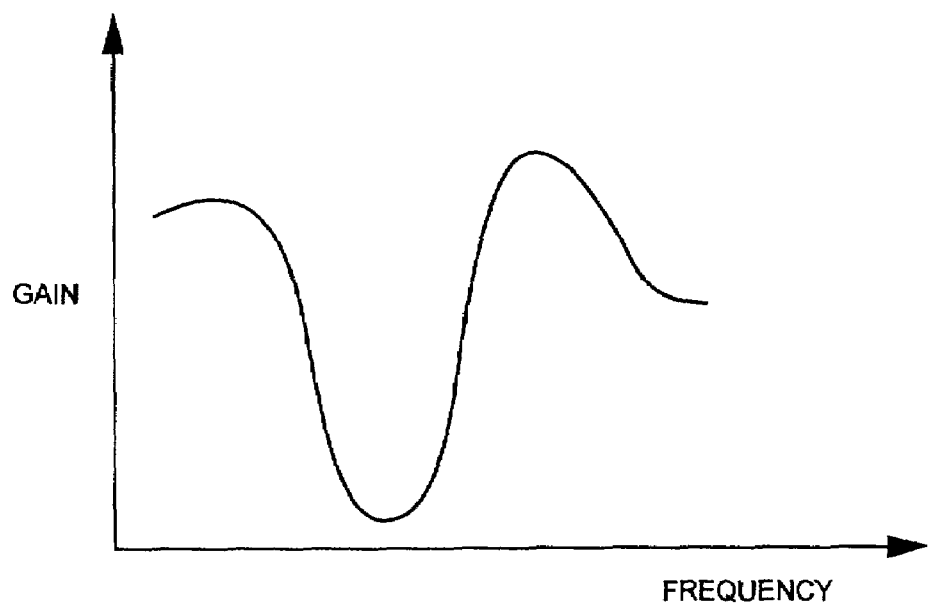
FIG. 7 is an illustration showing a relationship between fading and signal.
Figure 8:
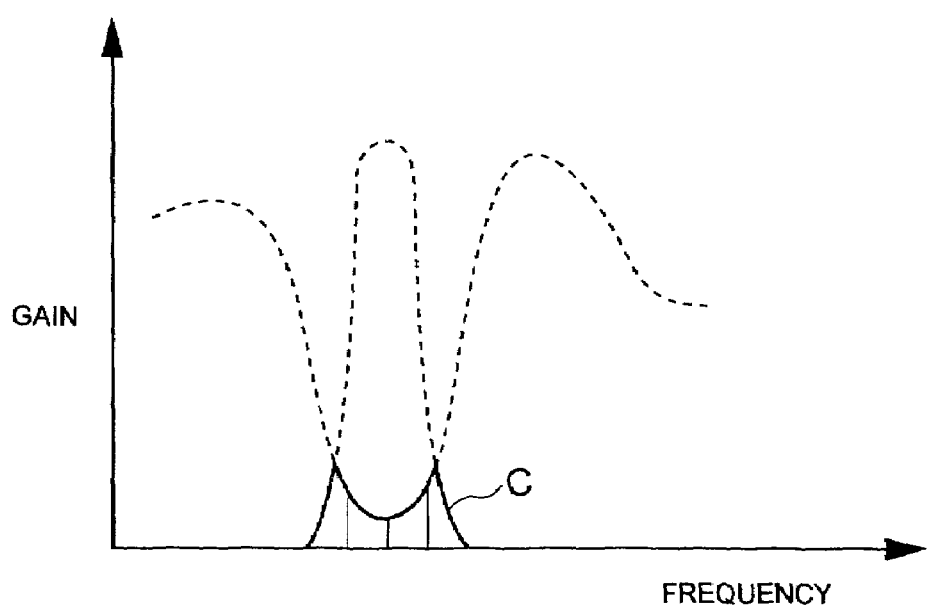
FIG. 8 is an illustration showing a relationship between fading and signal.
Figure 9:
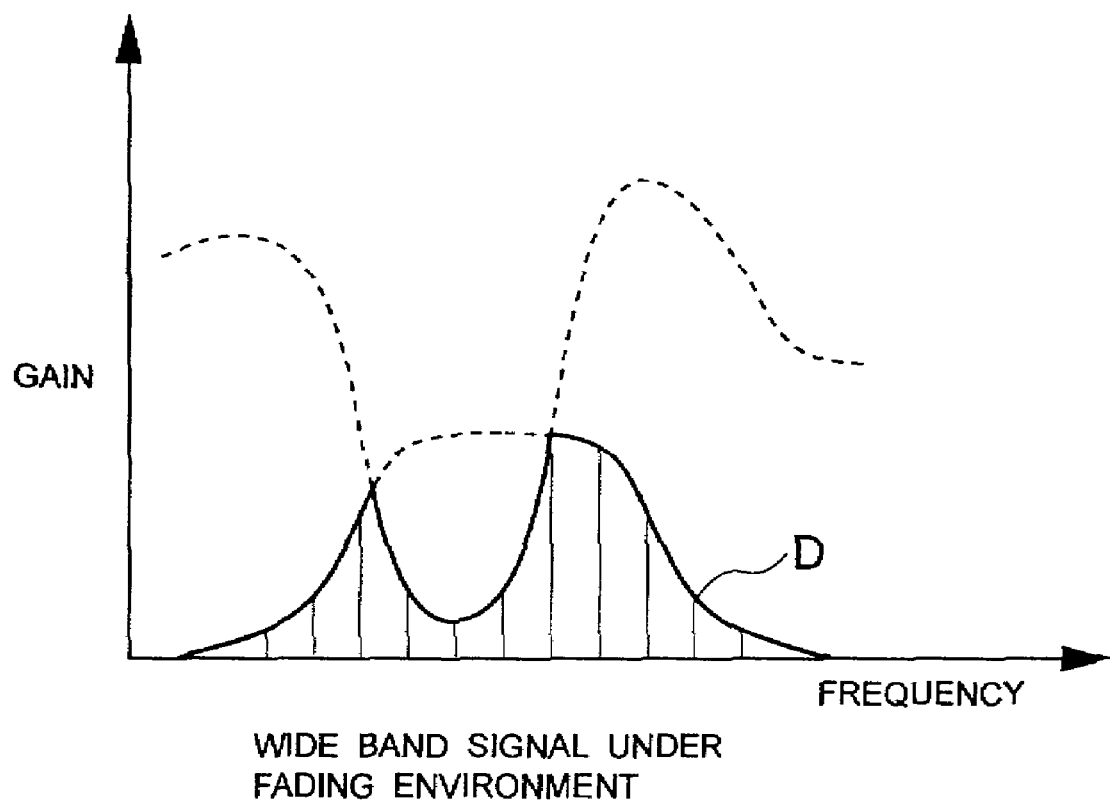
FIG. 9 is an illustration showing a relationship between fading and signal.

Finally, as one of the object of the present invention, "providing resistance against selective fading" is sought for. The meaning will be discussed hereinafter. FIGS. 7 to 9 are illustration showing relationship between fading and signal. In FIGS. 7 to 9, horizontal axes represent frequency (Hz) and vertical axes represent gain (dB).

FIG. 7 diagrammatically expresses instantaneous suppressing condition of fading in a certain pass connecting a mobile station (communication station A) and a base station (communication station B) as a filter characteristics. Under this fading environment, passing characteristics of a narrow band signal C is shown in FIG. 8, and passing characteristics of a wide band signal D is shown in FIG. 9. An energy of the spread signal C shown in FIG. 8 is equal to that of the spread signal D shown in FIG. 9. Comparing the spread signals of FIGS. 8 and 9, it should be appreciated that greater magnitude of energy is remained in the spread signal D of FIG. 9 than the spread signal C of FIG. 8 (hatched areas of FIGS. 8 and 9). In case of the spread spectrum communication system, spread signal is demodulated with dispreading. Therefore, if even a part of energy spread over the band in substantially uniform fashion is remained, possibility of success of demodulation is left. This is the reason why the spread spectrum communication system is strong against selective fading. Namely, merit of widening of the band in the spread spectrum communication system according to the present invention utilizes the fact that even in flat fading condition, it can be selective fading when the band is widened.

According to the present invention, since control means for controlling the transmission band width and transmission power of the counterpart equipment depending upon communication quality, resistance against selective fading can be provided, and in conjunction therewith, the reception bit error ratio can be lowered to successfully prevent lowering of circuit use ratio.

More particularly, for increasing of reception bit error ratio, the present invention transits to wider band channel to provide resistance against selective fading and to obtain spread gain to reduce reception bit error ratio. On the other hand, by the control logic flowchart shown in FIG. 3, in view of fading and transmission loss in the communication path between the base station and the terminal, for the terminal in relatively easy environment, the channel of narrow band is selected, and for a terminal in relatively severe environment, the channel of wide band is selected to permit transmission and reception at possible minimum power in each communication path. By minimizing transmission power, influence to code multiplexed other channels can be suppressed to increase circuit capacity. Furthermore, by reduction of the transmission power, power saving in the terminal can be achieved. Also, since the chip rate can be optimized depending upon the communication environment, such as fading, transmission loss and so forth in the communication path, load on an Integrated Circuit (IC) performing spreading process can be reduced to contribute for power saving in the terminal.

By this, the spread spectrum communication system according to the present invention may provide more stable communication quality than the conventional spread spectrum communication system. On the other hand, transmission power can be lowered to achieve power saving and increase of circuit capacity.

Furthermore, according to the present invention, since control step for controlling the transmission band width and transmission power of the counterpart equipment depending upon communication quality is included, the effect set forth above can be achieved.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A spread spectrum communication system comprising:
   a receiving unit configured to receive a communication quality of a communication channel between an equipment and a counterpart equipment;
   a transmitting unit configured to transmit data to the counterpart equipment; and
   a control unit configured to control a transmission band width and a transmission power of a counterpart equipment depending upon said communication quality,
   wherein when said communication quality is not degraded below a predetermined level and the transmission power is not minimum, the transmission power is lowered, and
   wherein said control unit comprises:
      a reception control arithmetic portion configured to receive a reception signal error ratio and to determine and output a receiver gain;
      a reception gain distribution control portion configured to receive the receiver gain output by the reception control arithmetic portion and to determine and output a reception amplifier control signal to an RF amplifier of the receiving unit and a reception clock control signal to a first clock generator of the receiving unit that is used to generate a first pseudo-noise signal;
      a transmission control arithmetic portion configured to receive transmission chip rate information and to determine and output a transmission gain; and
      a transmission gain distribution control portion configured to receive the transmission gain output by the transmission control arithmetic portion and to determine and output a transmission amplifier control signal to a power amplifying portion of the transmitting unit and a transmission clock control signal to a second clock generator of the transmitting unit that is used to generate a second pseudo-noise signal.

2. A spread spectrum communication system comprising:
   a receiving unit configured to receive a communication quality of a communication channel between an equipment and a counterpart equipment;
   a transmitting unit configured to transmit data to the counterpart equipment; and
   a control unit configured to control a transmission band width and a transmission power of a counterpart equipment depending upon said communication quality,
   wherein when said communication quality is not degraded below a predetermined level and the transmission power is minimum, and when a vacant band is present in a narrower band than a currently used frequency band, the frequency band is varied to narrower band, and
   wherein said control unit comprises:
      a reception control arithmetic portion configured to receive a reception signal error ratio and to determine and output a receiver gain;
      a reception gain distribution control portion configured to receive the receiver gain output by the reception control arithmetic portion and to determine and output a reception amplifier control signal to an RF amplifier of the receiving unit and a reception clock control signal to a first clock generator of the receiving unit that is used to generate a first pseudo-noise signal;
      a transmission control arithmetic portion configured to receive transmission chip rate information and to determine and output a transmission gain; and
      a transmission gain distribution control portion configured to receive the transmission gain output by the transmission control arithmetic portion and to determine and output a transmission amplifier control signal to a power amplifying portion of the transmitting unit and a transmission clock control signal to a second clock generator of the transmitting unit that is used to generate a second pseudo-noise signal.

3. A spread spectrum communication system comprising:
   a receiving unit configured to receive a communication quality of a communication channel between an equipment and a counterpart equipment;
   a transmitting unit configured to transmit data to the counterpart equipment; and
   a control unit configured to control a transmission band width and a transmission power of a counterpart equipment depending upon said communication quality,
   wherein said communication quality is classified into three levels depending upon degree, when said communication quality is in medium level,
   wherein said control unit varies the transmission band width in preference to varying the transmission power, and
   wherein said control unit comprises:
      a reception control arithmetic portion configured to receive a reception signal error ratio and to determine and output a receiver gain;
      a reception gain distribution control portion configured to receive the receiver gain output by the reception control arithmetic portion and to determine and output a reception amplifier control signal to an RF amplifier of the receiving unit and a reception clock control signal to a first clock generator of the receiving unit that is used to generate a first pseudo-noise signal;
      a transmission control arithmetic portion configured to receive transmission chip rate information and to determine and output a transmission gain; and
      a transmission gain distribution control portion configured to receive the transmission gain output by the transmission control arithmetic portion and to determine and output a transmission amplifier control signal to a power amplifying portion of the transmitting unit and a transmission clock control signal to a second clock generator of the transmitting unit that is used to generate a second pseudo-noise signal.

4. A spread spectrum communication method comprising:
   receiving, by a receiving unit of an equipment engaged in communications with a counterpart equipment, a communication quality of a communication channel used for the communications between the equipment and the counterpart equipment;
   transmitting, by a transmitting unit of the equipment, data to the counterpart equipment; and
   controlling, by a control unit of the equipment, a transmission band width and a transmission power of a counterpart equipment depending upon said communication quality, wherein when said communication quality is degraded below a predetermined level, said control step varies a transmission band to a wider frequency band when a vacant band is present in a wider band than a currently used frequency band, wherein said control unit varies the transmission band width in preference to varying the transmission power, and wherein said control unit varies the transmission band width by performing the steps of:

receiving, by a reception control arithmetic portion, a reception signal error ratio and to determine and output a receiver gain;

receiving, by a reception gain distribution control portion, the receiver gain output by the reception control arithmetic portion and determining and outputting a reception amplifier control signal to an RF amplifier of the receiving unit and a reception clock control signal to a first clock generator of the receiving unit that is used to generate a first pseudo-noise signal;

receiving, by a transmission control arithmetic portion, transmission chip rate information and determining and outputting a transmission gain; and receiving, by a transmission gain distribution control portion, the transmission gain output by the transmission control arithmetic portion and determining and outputting a transmission amplifier control signal to a power amplifying portion of the transmitting unit and a transmission clock control signal to a second clock generator of the transmitting unit that is used to generate a second pseudo-noise signal.

5. A spread spectrum communication method comprising:

receiving, by receiving unit of an equipment engaged in communications with a counterpart equipment, a communication quality of a communication channel used for the communications between the equipment and the counterpart equipment;

transmitting, by a transmitting unit of the equipment, data to the counterpart equipment; and controlling, by a control unit of the equipment, a transmission band width and a transmission power of a counterpart equipment depending upon said communication quality, wherein when said communication quality is degraded below a predetermined level, said control step increases a transmission power when a vacant band is not present in a wider band than a currently used frequency band, wherein said control step varies the transmission band width in preference to varying the transmission power, and wherein said control unit varies the transmission band width by performing the steps of:

receiving, by a reception control arithmetic portion, a reception signal error ratio and to determine and output a receiver gain;

receiving, by a reception gain distribution control portion, the receiver gain output by the reception control arithmetic portion and determining and outputting a reception amplifier control signal to an RF amplifier of the receiving unit and a reception clock control signal to a first clock generator of the receiving unit that is used to generate a first pseudo-noise signal;

receiving, by a transmission control arithmetic portion, transmission chip rate information and determining and outputting a transmission gain; and receiving, by a transmission gain distribution control portion, the transmission gain output by the transmission control arithmetic portion and determining and outputting a transmission amplifier control signal to a power amplifying portion of the transmitting unit and a transmission clock control signal to a second clock generator of the transmitting unit that is used to generate a second pseudo-noise signal.

6. A spread spectrum communication method comprising:

receiving, by a receiving unit of an equipment engaged in communications with a counterpart equipment, a communication quality of a communication channel used for the communications between the equipment and the counterpart equipment;

transmitting, by a transmitting unit of the equipment, data to the counterpart equipment; and controlling, by a control unit of the equipment, a transmission band width and a transmission power of a counterpart equipment depending upon said communication quality, wherein when said communication quality is not degraded below a predetermined level and the transmission power is not minimum, the transmission power is lowered, and wherein said control unit varies the transmission band width by performing the steps of:

receiving, by a reception control arithmetic portion, a reception signal error ratio and to determine and output a receiver gain;

receiving, by a reception gain distribution control portion, the receiver gain output by the reception control arithmetic portion and determining and outputting a reception amplifier control signal to an RF amplifier of the receiving unit and a reception clock control signal to a first clock generator of the receiving unit that is used to generate a first pseudo-noise signal;

receiving, by a transmission control arithmetic portion, transmission chip rate information and determining and outputting a transmission gain; and receiving, by a transmission gain distribution control portion, the transmission gain output by the transmission control arithmetic portion and determining and outputting a transmission amplifier control signal to a power amplifying portion of the transmitting unit and a transmission clock control signal to a second clock generator of the transmitting unit that is used to generate a second pseudo-noise signal.

7. A spread spectrum communication method comprising:

receiving, by a receiving unit of an equipment engaged in communications with a counterpart equipment, a communication quality of a communication channel used for the communications between the equipment and the counterpart equipment;

transmitting, by a transmitting unit of the equipment, data to the counterpart equipment; and controlling, by a control unit of the equipment, a transmission band width and a transmission power of a counterpart equipment depending upon said communication quality, wherein when said communication quality is not degraded below a predetermined level and the transmission power is minimum, and when a vacant band is not present in a narrower band than a currently used frequency band, the current frequency band and transmission power are maintained, wherein said control step varies the transmission band width in preference to varying the transmission power, and wherein said control unit varies the transmission band width by performing the steps of:
receiving, by a reception control arithmetic portion, a reception signal error ratio and to determine and output a receiver gain;
receiving, by a reception gain distribution control portion, the receiver gain output by the reception control arithmetic portion and determining and outputting a reception amplifier control signal to an RF amplifier of the receiving unit and a reception clock control signal to a first clock generator of the receiving unit that is used to generate a first pseudo-noise signal;
receiving, by a transmission control arithmetic portion, transmission chip rate information and determining and outputting a transmission gain; and
receiving, by a transmission gain distribution control portion, the transmission gain output by the transmission control arithmetic portion and determining and outputting a transmission amplifier control signal to a power amplifying portion of the transmitting unit and a transmission clock control signal to a second clock generator of the transmitting unit that is used to generate a second pseudo-noise signal.

8. A spread spectrum communication method comprising:
receiving, by a receiving unit of an equipment engaged in communications with a counterpart equipment, a communication quality of a communication channel used for the communications between the equipment and the counterpart equipment;
transmitting, by a transmitting unit of the equipment, data to the counterpart equipment; and
controlling, by a control unit of the equipment, a transmission band width and a transmission power of a counterpart equipment depending upon said communication quality,
wherein when said communication quality is not degraded below a predetermined level and the transmission power is minimum, and when a vacant band is present in a narrower band than a currently used frequency band, the frequency band is varied to narrower band,
wherein said control unit varies the transmission band width by performing the steps of:
receiving, by a reception control arithmetic portion, a reception signal error ratio and to determine and output a receiver gain;
receiving, by a reception gain distribution control portion, the receiver gain output by the reception control arithmetic portion and determining and outputting a reception amplifier control signal to an RF amplifier of the receiving unit and a reception clock control signal to a first clock generator of the receiving unit that is used to generate a first pseudo-noise signal;
receiving, by a transmission control arithmetic portion, transmission chip rate information and determining and outputting a transmission gain; and
receiving, by a transmission gain distribution control portion, the transmission gain output by the transmission control arithmetic portion and determining and outputting a transmission amplifier control signal to a power amplifying portion of the transmitting unit and a transmission clock control signal to a second clock generator of the transmitting unit that is used to generate a second pseudo-noise signal.

9. A spread spectrum communication method comprising:
receiving, by a receiving unit of an equipment engaged in communications with a counterpart equipment, a communication quality of a communication channel used for the communications between the equipment and the counterpart equipment;
transmitting, by a transmitting unit of the equipment, data to the counterpart equipment; and
controlling, by a control unit of the equipment, a transmission band width and a transmission power of a counterpart equipment depending upon said communication quality,
wherein said communication quality is classified into three levels depending upon degree, when said communication quality is in medium level, said control step maintains current frequency band and transmission power,
wherein said control step varies the transmission band width in preference to varying the transmission power,
wherein said control unit varies the transmission band width by performing the steps of:
receiving, by a reception control arithmetic portion, a reception signal error ratio and to determine and output a receiver gain;
receiving, by a reception gain distribution control portion, the receiver gain output by the reception control arithmetic portion and determining and outputting a reception amplifier control signal to an RF amplifier of the receiving unit and a reception clock control signal to a first clock generator of the receiving unit that is used to generate a first pseudo-noise signal;
receiving, by a transmission control arithmetic portion, transmission chip rate information and determining and outputting a transmission gain; and
receiving, by a transmission gain distribution control portion, the transmission gain output by the transmission control arithmetic portion and determining and outputting a transmission amplifier control signal to a power amplifying portion of the transmitting unit and a transmission clock control signal to a second clock generator of the transmitting unit that is used to generate a second pseudo-noise signal.

10. A spread spectrum communication system comprising:
a receiving unit configured to receive a communication quality of a communication channel between an equipment and a counterpart equipment;
a transmitting unit configured to transmit data to the counterpart equipment; and
a control unit configured to control a transmission band width and a transmission power of a counterpart equipment depending upon said communication quality,
wherein when said communication quality is degraded below a predetermined level, said control unit varies the transmission band width in preference to varying the transmission power, and
wherein said control unit comprises:
a reception control arithmetic portion configured to receive a reception signal error ratio and to determine and output a receiver gain;
a reception gain distribution control portion configured to receive the receiver gain output by the reception control arithmetic portion and to determine and output a reception amplifier control signal to an RF amplifier of the receiving unit and a reception clock control signal to a first clock generator of the receiving unit that is used to generate a first pseudo-noise signal;

a transmission control arithmetic portion configured to receive transmission chip rate information and to determine and output a transmission gain; and a transmission gain distribution control portion configured to receive the transmission gain output by the transmission control arithmetic portion and to determine and output a transmission amplifier control signal to a power amplifying portion of the transmitting unit and a transmission clock control signal to a second clock generator of the transmitting unit that is used to generate a second pseudo-noise signal.

11. A spread spectrum communication method comprising:

receiving, by a receiving unit of an equipment engaged in communications with a counterpart equipment, a communication quality of a communication channel used for the communications between the equipment and the counterpart equipment;

transmitting, by a transmitting unit of the equipment, data to the counterpart equipment; and controlling, by a control unit of the equipment, a transmission band width and a transmission power of a counterpart equipment depending upon said communication quality, wherein when said communication quality is degraded below a predetermined level, said control step varies the transmission band width in preference to varying the transmission power, and wherein said control unit varies the transmission band width by performing the steps of:

receiving, by a reception control arithmetic portion, a reception signal error ratio and to determine and output a receiver gain;

receiving, by a reception gain distribution control portion, the receiver gain output by the reception control arithmetic portion and determining and outputting a reception amplifier control signal to an RF amplifier of the receiving unit and a reception clock control signal to a first clock generator of the receiving unit that is used to generate a first pseudo-noise signal;

receiving, by a transmission control arithmetic portion, transmission chip rate information and determining and outputting a transmission gain; and receiving, by a transmission gain distribution control portion, the transmission gain output by the transmission control arithmetic portion and determining and outputting a transmission amplifier control signal to a power amplifying portion of the transmitting unit and a transmission clock control signal to a second clock generator of the transmitting unit that is used to generate a second pseudo-noise signal.

12. A spread spectrum system as set forth in claim 1, wherein the transmission control arithmetic portion also receives transmission command information output by the counterpart equipment, and wherein the transmission gain is determined based on both the transmission chip rate information and the transmission command information.

13. A spread spectrum system as set forth in claim 2, wherein the transmission control arithmetic portion also receives transmission command information output by the counterpart equipment, and wherein the transmission gain is determined based on both the transmission chip rate information and the transmission command information.

14. A spread spectrum system as set forth in claim 3, wherein the transmission control arithmetic portion also receives transmission command information output by the counterpart equipment, and wherein the transmission gain is determined based on both the transmission chip rate information and the transmission command information.

15. A spread spectrum method as set forth in claim 4, further comprising the step of:

receiving, by the transmission control arithmetic portion, transmission command information output by the counterpart equipment, and wherein the transmission gain is determined based on both the transmission chip rate information and the transmission command information.

16. A spread spectrum method as set forth in claim 5, further comprising the step of:

receiving, by the transmission control arithmetic portion, transmission command information output by the counterpart equipment, and wherein the transmission gain is determined based on both the transmission chip rate information and the transmission command information.

17. A spread spectrum method as set forth in claim 6, further comprising the step of:

receiving, by the transmission control arithmetic portion, transmission command information output by the counterpart equipment, and wherein the transmission gain is determined based on both the transmission chip rate information and the transmission command information.

18. A spread spectrum method as set forth in claim 7, further comprising the step of:

receiving, by the transmission control arithmetic portion, transmission command information output by the counterpart equipment, and wherein the transmission gain is determined based on both the transmission chip rate information and the transmission command information.

19. A spread spectrum method as set forth in claim 8, further comprising the step of:

receiving, by the transmission control arithmetic portion, transmission command information output by the counterpart equipment, and wherein the transmission gain is determined based on both the transmission chip rate information and the transmission command information.

20. A spread spectrum method as set forth in claim 9, further comprising the step of:

receiving, by the transmission control arithmetic portion, transmission command information output by the counterpart equipment, and wherein the transmission gain is determined based on both the transmission chip rate information and the transmission command information.

* * * * *